United States Patent
Saito et al.

(10) Patent No.: US 7,134,327 B2
(45) Date of Patent: Nov. 14, 2006

(54) PEDALING FORCE SENSOR AND PEDALING FORCE DETECTION DEVICE USING THE SENSOR

(75) Inventors: Kiyoshi Saito, Osaka (JP); Shinjiro Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/530,124

(22) PCT Filed: Oct. 28, 2004

(86) PCT No.: PCT/JP2004/015979

§ 371 (c)(1),
(2), (4) Date: Apr. 4, 2005

(87) PCT Pub. No.: WO2005/043101

PCT Pub. Date: May 12, 2005

(65) Prior Publication Data

US 2006/0162434 A1     Jul. 27, 2006

(30) Foreign Application Priority Data

Oct. 30, 2003   (JP) .............................. 2003-370387

(51) Int. Cl.
*G01L 5/28* (2006.01)
(52) U.S. Cl. ....................................................... 73/132
(58) Field of Classification Search .................. 73/121, 73/129, 132, 763, 768, 774, 781, 855, 856, 73/862.625, 862.621, 862.53
See application file for complete search history.

(56) References Cited

U.S. PATENT DOCUMENTS

| | | | | |
|---|---|---|---|---|
| 3,602,043 A | * | 8/1971 | Markey | 73/132 |
| 3,788,131 A | * | 1/1974 | Markey | 73/132 |
| 4,206,636 A | * | 6/1980 | Hendrix | 73/132 |
| 5,115,186 A | * | 5/1992 | Reinartz et al. | 324/207.22 |
| 5,217,280 A | * | 6/1993 | Nykerk et al. | 303/3 |
| 5,563,355 A | * | 10/1996 | Pluta et al. | 73/862.625 |
| 6,031,448 A | * | 2/2000 | Starkweather et al. | 338/106 |
| 6,446,500 B1 | * | 9/2002 | Marquardt et al. | 73/132 |
| 6,595,045 B1 | * | 7/2003 | Fuglewicz et al. | 73/129 |
| 6,668,659 B1 | * | 12/2003 | Morikawa et al. | 73/729.1 |
| 6,871,916 B1 | * | 3/2005 | Stephane et al. | 303/113.4 |
| 2005/0269871 A1 | * | 12/2005 | Saito | 303/20 |
| 2006/0064977 A1 | * | 3/2006 | Ohlig et al. | 60/534 |

FOREIGN PATENT DOCUMENTS

| JP | 06-007030 | 1/1994 |
|---|---|---|
| JP | 06-005248 | 2/1994 |
| JP | 2002-205628 | 7/2002 |

* cited by examiner

*Primary Examiner*—Eric S. McCall
(74) *Attorney, Agent, or Firm*—McDermott Will & Emery LLP

(57) ABSTRACT

A force-on-pedal sensor of the present invention includes a cylindrical substrate (11) whose one end is closed having: a hole part (11*d*) at a center of its side section (11*c*); and a strain resistance element (13) via an insulating layer (12) at its side section (11*c*), a coil spring (15) coaxially inserted from an open end of the substrate (11), an inputting shaft having a stepped part (14*a*) contacted with one end of the coil spring (15) and inserted in the hole part (11*d*) in such a manner that a part of the inputting shaft (14) is protruded from the hole part (11*d*), and a stopper at a position where the inputting shaft (14) is protruded.

11 Claims, 5 Drawing Sheets

FIG. 5A
PRIOR ART
FIG. 5B
PRIOR ART
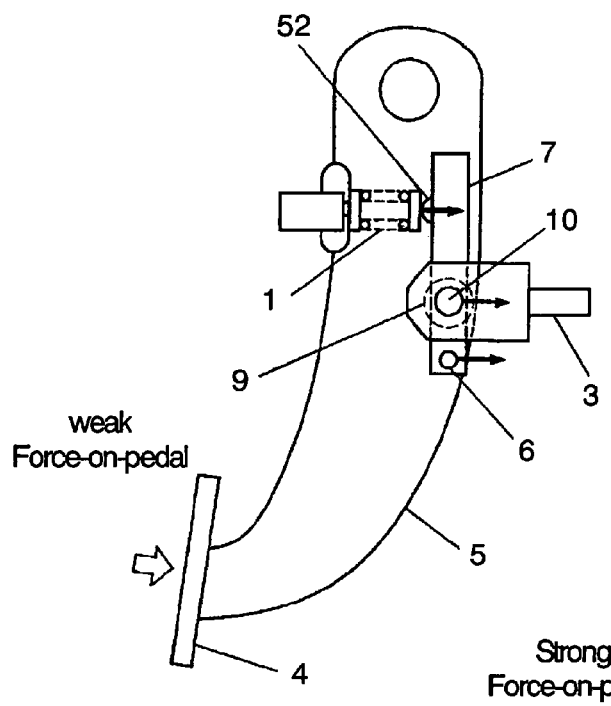
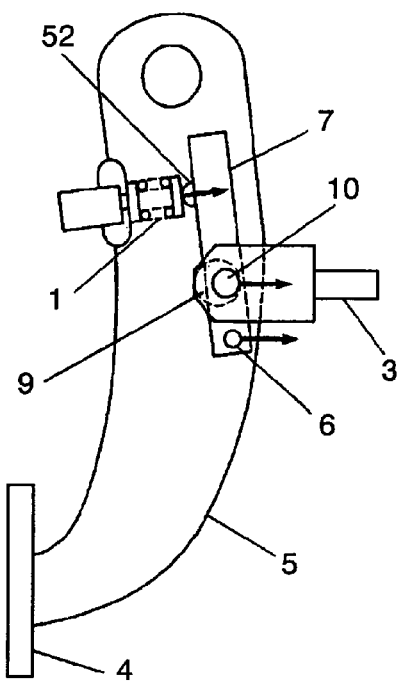

PEDALING FORCE SENSOR AND PEDALING FORCE DETECTION DEVICE USING THE SENSOR This application is a U.S. National Phase Application of PCT/JP2004/015979.

TECHNICAL FIELD

The present invention relates to a force-on-pedal sensor for detecting force-on-pedal exerted on an accelerator, a brake or the like of a motor vehicle, for example, and a pedal-pressure detecting device using the same.

BACKGROUND ART

FIGS. 4, 5A and 5B are a detailed sectional view and general views of a conventional force-on-pedal sensor and pedal-pressure detecting device using the same.

As shown in FIG. 4, spring 23 is positioned between first cover member 21 and second cover member 22 both of which have a U-like glass shape in section, and they are disposed on sensor head 31.

Bellows 32 is formed beneath sensor head 31, and filled with liquid 38. Sensor chip 35 is positioned so as to be immersed in liquid 38, and electrically coupled with terminal 37 via bonding wire 36.

As shown in FIGS. 5A and 5B, pedal section 4 is formed at one end of lever section 5, and force-on-pedal sensor 1 is formed at the other end thereof. Lever section 5 is linked with push-rod 3 using second shaft 10. Arm 7 is formed so as to be contacted with force-on-pedal sensor 1 at load applied point 52, where first shaft 6 operates as a working point and second shaft 10 operates as a supporting point.

An operation of the force-on-pedal sensor is discussed hereinafter with reference to FIG. 4. When force-on-pedal is applied on first cover member 21, the force-on-pedal is transmitted through spring 23 to second cover member 22 and pushes sensor head 31. This pushing force is transmitted to sensor chip 35 by liquid 38, whereby the force-on-pedal is detected. Thus, the force-on-pedal is outputted as an electric signal through bonding wire 36 and terminal 37.

An operation of the pedal-pressure detecting device is discussed hereinafter with reference to FIGS. 5A and 5B. When the force-on-pedal is not more than 200N, second shaft 10 does not contact a circumference of hole 9, and a load is applied to force-on-pedal sensor 1 from load applied point 52 via arm 7. The load applied at load applied point 52 is attenuated rather than a load applied to first shaft 6 because of leverage formed by arm 7, second shaft 10 and first shaft 6. An attenuation ratio is determined by a ratio of a distance between load applied point 52 and second shaft 10 to a distance between second shaft 10 and first shaft 6.

As shown in FIG. 5B, when the force-on-pedal exceeds more than 200N, second shaft 10 contacts the circumference of hole 9, so that no more load is applied to force-on-pedal sensor 1.

An example of the force-on-pedal sensor mentioned above is disclosed in Unexamined Japanese Patent Publication No. 2002-205628. However, the conventional force-on-pedal sensor has a complicated structure because it is required an airtight characteristic to seal liquid 38, so that structural reliability is low.

In addition, if bellows 32 is injured in assembling, liquid 38 is leaked and a detecting function of the sensor is impaired, therefore handling is not easy.

The present invention is directed to solve the problems pointed out above and provides a force-on-pedal sensor having a simple structure, high structural reliability and easy-handling.

SUMMARY OF THE INVENTION

A force-on-pedal sensor of the present invention includes the following elements:
- a cylindrical substrate whose one end is closed having:
  - a hole at a center of its side section; and
  - a strain resistance element via an insulating layer at its side section;
- a coil spring coaxially inserted from an open end of the substrate;
- an inputting shaft having a stepped part contacted with one end of the coil spring and inserted in the hole in such a manner that a part of the inputting shaft is protruded from the hole; and
- a stopper at a position where the inputting shaft is protruded.

Furthermore, a pedal-pressure detecting device of the present invention includes the following elements:
- a brake arm;
- a link whose one end is linked with the brake arm using a rotatable first shaft and the other end is linked with a push-rod which transmits force to a master cylinder; and
- an arm, which is installed at the link, for transmitting a load by contacting the inputting shaft of the force-on-pedal sensor.

BRIEF DESCRIPTION OF THE DRAWINGS

FIG. 5A is a general view showing a conventional pedal-pressure detecting device.

FIG. 5B is a general view showing the conventional pedal-pressure detecting device.

Figure 1:
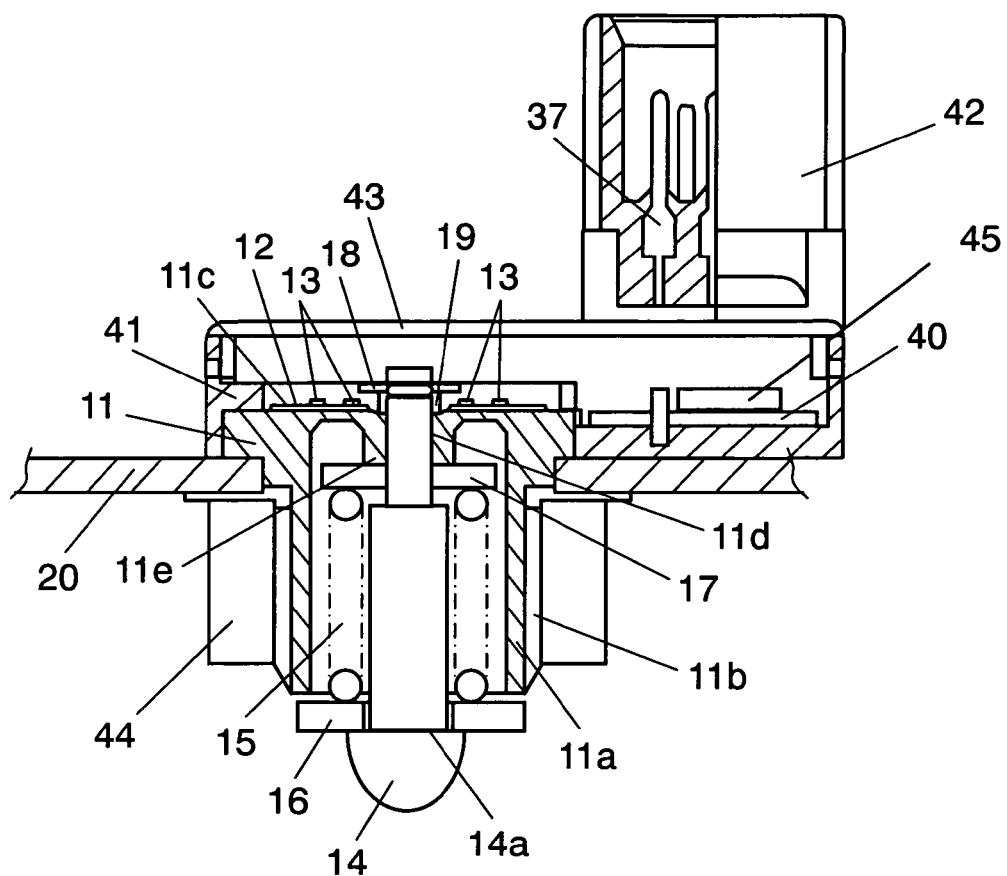
FIG. 1 is a sectional view showing a force-on-pedal sensor in accordance with an exemplary embodiment of the present invention.

REFERENCE MARKS IN THE DRAWINGS 1 force-on-pedal sensor
2 brake arm
3 push-rod
4 pedal section
5 lever section
6 first shaft
7 arm
8 link
10 second shaft
11 substrate
11a cylindrical section
11b screw section
11c side section
11d hole part 11e convex part
11f projection plane of convex part
11g projection plane of cylindrical section
12 insulating layer
13 strain resistance element
13a strain resistance element disposed inside
13b strain resistance element disposed outside
14 inputting shaft
14a stepped part
15 coil spring
16 first stopper
17 washer
18 second stopper
19 spacer
20 flange
37 terminal
40 circuit board
41 resin case
42 connector
43 cover
44 nut
45 processing circuit
52 load applied point
53 master cylinder
54 return spring

DETAILED DESCRIPTION OF THE PREFERRED EMBODIMENTS

A sensor of the present invention includes the following structures:
a cylindrical substrate whose one end is closed having:
a hole at a center of its side section; and
a strain resistance element via an insulating layer at its side section;
a coil spring coaxially inserted from an open end of the substrate;
an inputting shaft having a stepped part contacted with one end of the coil spring and inserted in the hole in such a manner that a part of the inputting shaft is protruded from the hole; and
a stopper at a position where the inputting shaft is protruded.

Using the structure mentioned above, the stout sensor having high structural reliability can be provided. In addition, by providing a screw section at an outer circumference of a cylindrical section of the substrate, mounting becomes easy and assembling performance improves.

Further, according to the sensor of the present invention, a first stopper having an outer diameter larger than an inner diameter of the cylindrical section of the substrate is inserted into the stepped part of the inputting shaft, and contacts the coil spring. Therefore, when the coil spring is contracted to a certain load, the first stopper contacts the substrate, so that no more load is applied. Using the structure mentioned above, even when excessive force-on-pedal is applied, sensor which has high structural reliability and is not damaged can be provided.

Still further, according to the sensor of the present invention, the substrate is formed by mechanically coupling the side section with the cylindrical section, and the strain resistance element and a processing circuit are formed in one piece at the side section. Thus, connecting reliability between a circuit board and an element can be improved.

A pedal-pressure detecting device of the present invention includes the following structures:

a brake arm;
a link whose one end is linked with the brake arm using a rotatable first shaft and the other end is linked with a push-rod which transmits force to a master cylinder; and
an arm, which is installed at the link, for transmitting a load by contacting the inputting shaft of the force-on-pedal sensor.

Using the structure mentioned above, the pedal-pressure detecting device having high structural reliability can be provided.

Furthermore, the pedal-pressure detecting device of the present invention has a universal joint section between the arm and the inputting shaft. Using the structure mentioned above, even when a load is applied to the inputting shaft at load applied point 52 in a slightly slanting direction, force-on-pedal is exactly transmitted and precisely detected.

Exemplary embodiments of the present invention are demonstrated hereinafter with reference to the accompanying drawings, and it is emphasized that the drawings are diagrams and do not show actual dimensional relations between respective elements.

EXEMPLARY EMBODIMENT

In FIG. 1, flange 20 for mounting is mechanically fixed to lever section 5 (not shown), and whole force-on-pedal sensor 1 is fixed using screw section 11b and nut 44. Inputting shaft 14 is inserted from an opening of cylindrical section 11a of substrate 11, and one end thereof is inserted in hole part 11d so as to be protruded at its part. Coil spring 15 is inserted coaxially with inputting shaft 14 into cylindrical section 11a of substrate 11, and contacts first stopper 16 mounted at stepped part 14a of inputting shaft 14.

The other end of coil spring 15 contacts washer 17 disposed on convex part 11e. Inputting shaft 14 is fixed by second stopper 18 via spacer 19 at the protruded part, where inputting shaft 14 is inserted into hole part 11d and protruded from side section 11c, in such a manner that inputting shaft 14 is not dropped out. In this case, coil spring 15 is controlled with a thickness of spacer 19 and second stopper 18 in such a manner that coil spring 15 is contracted in a certain range. Strain resistance element 13 formed at side section 11c of substrate 11 is electrically coupled with circuit board 40 fixed at resin case 41. The output is led through terminal 37 of connector 42. Cover 43 is formed to protect them.

Figure 2A:
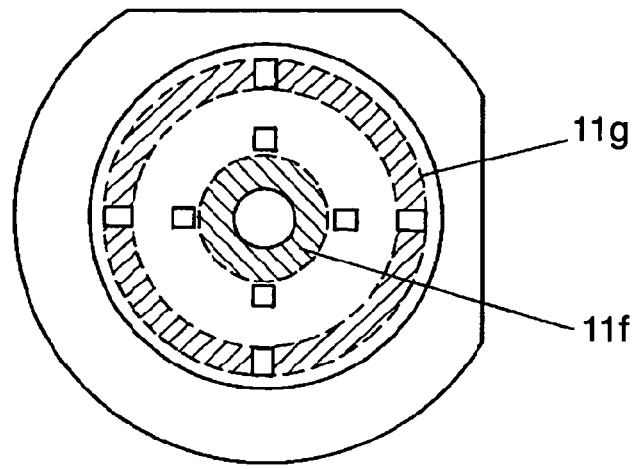
FIG. 2A is a plan view showing a substrate in accordance with the exemplary embodiment of the present invention.
Figure 2B:
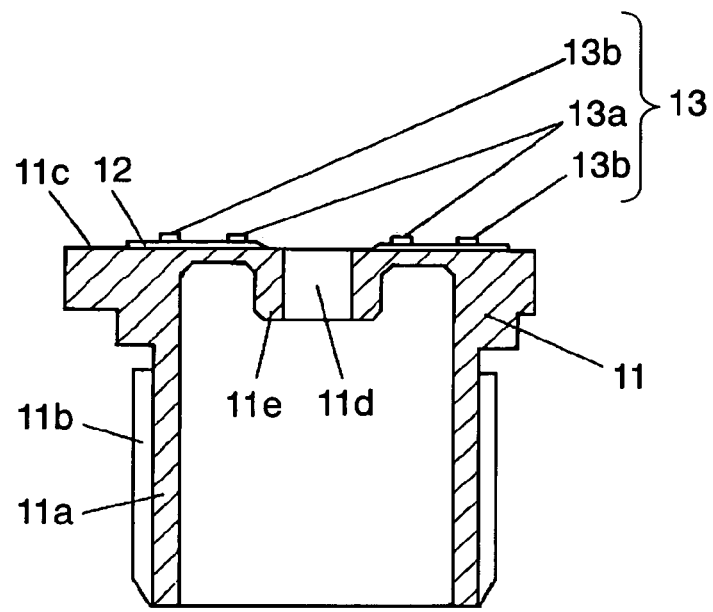
FIG. 2B is a sectional view showing the substrate in accordance with the exemplary embodiment of the present invention.

In FIG. 2, screw section 11b is formed at an outer circumference of cylindrical section 11a of substrate 11. Hole part 11d is formed at a center of side section 11c, and furthermore, insulating layer 12 is directly formed on side section 11c. Strain resistance element 13 is directly formed on insulating layer 12. Strain resistance element 13 is formed of two groups, each of which includes strain resistance element 13a disposed inside and strain resistance element 13b disposed outside. Strain resistance element 13a disposed inside is positioned at a neighborhood of projection plane 11f of convex part 11e where stress is most concentrated. Strain resistance element 13b disposed outside is positioned at a neighborhood of projection plane 11g of cylindrical section 11a which is hardly deformed. They are coupled by electrode patterns and form a Wheatstone bridge which is not shown.

Figure 3:
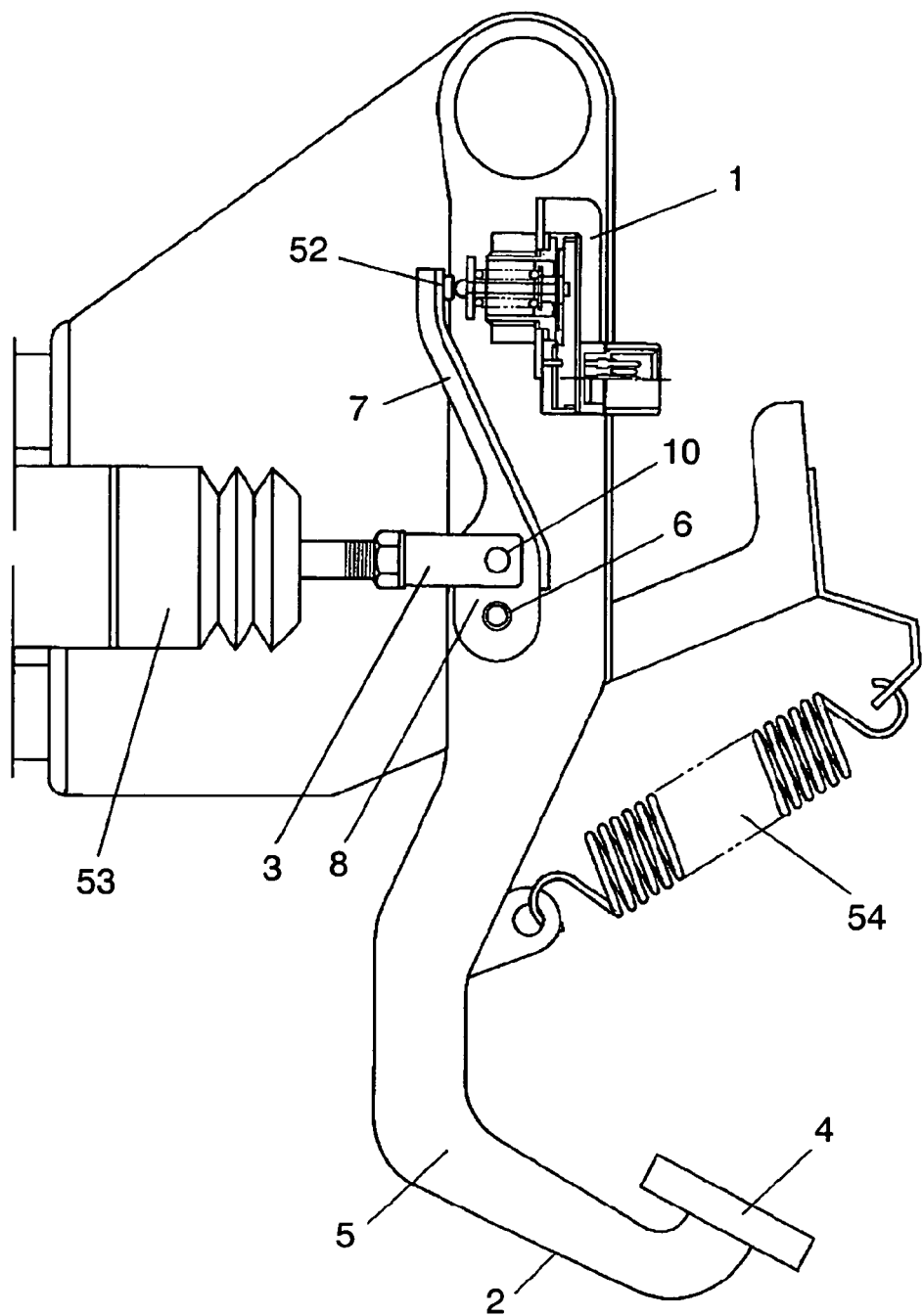
FIG. 3 is a general view showing a pedal-pressure detecting device in accordance with an exemplary embodiment of the present invention.
Figure 4:
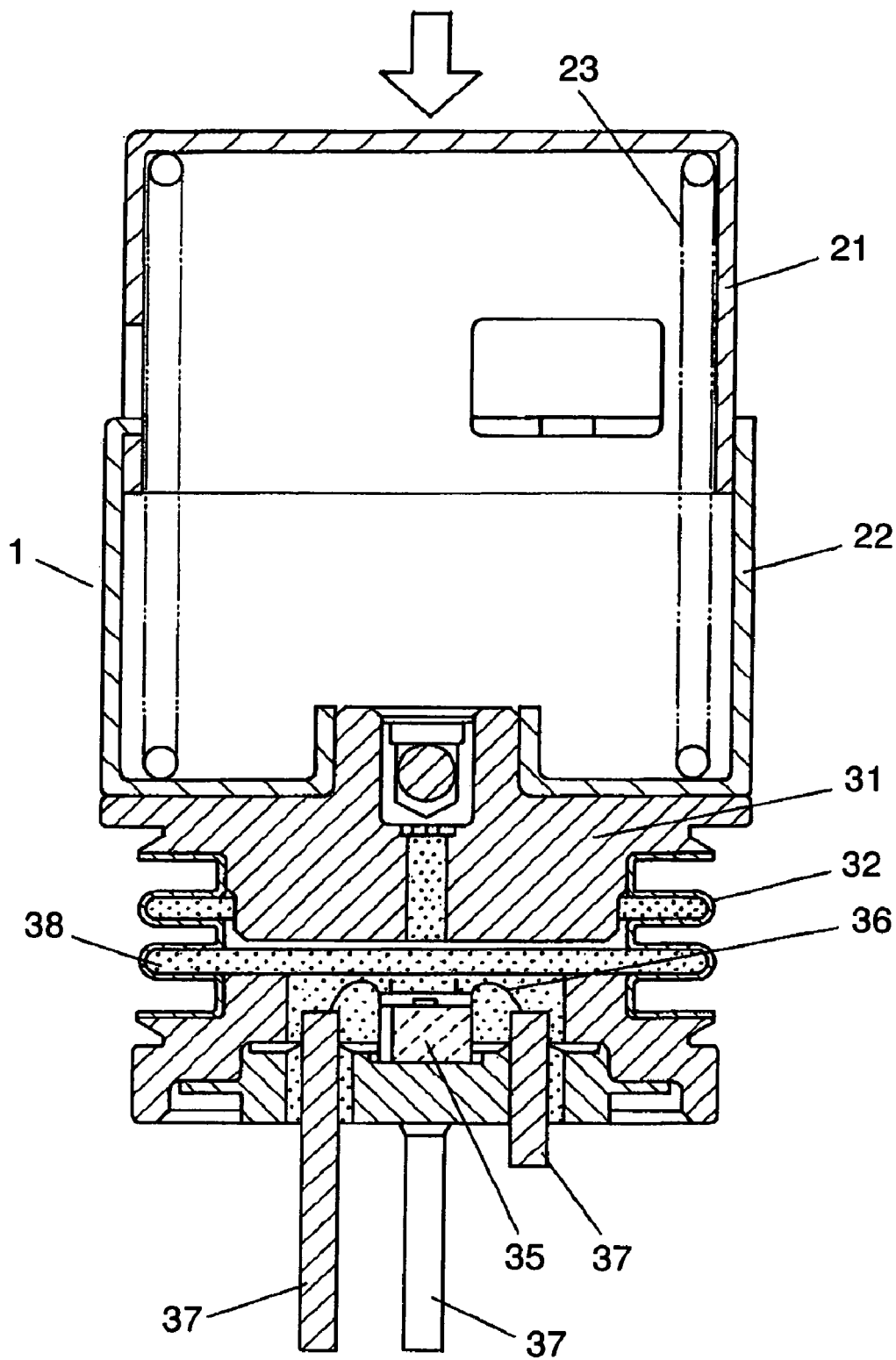
FIG. 4 is a sectional view showing a conventional force-on-pedal sensor.

In FIG. 3, brake arm 2 is formed of pedal section 4 and lever section 5. Pedal section 4 is provided at one end of lever section 5, and force-on-pedal sensor 1 is provided at the other end of lever section 5. Lever section 5 is linked with link 8 using first shaft 6, and furthermore, link 8 is linked with push-rod 3 using second shaft 10. Arm 7 is formed at link 8 so as to be contacted with force-on-pedal sensor 1 at load applied point 52, where first shaft 6 operates as a working point and second shaft 10 operates as a supporting point.

However, according to the present invention, conventional hole 9 with which lever section 5 is penetrated is not formed, so that second shaft 10 does not contact lever section 5. Push-rod 3 is linked with master cylinder 53, and furthermore, linked with a brake actuator (not shown). Brake arm 2 returns to a predetermined position by return spring 54 while force-on-pedal is not applied.

An operation using the structure discussed above is described hereinafter.

First, an operation of force-on-pedal sensor 1 is discussed hereinafter with reference to FIGS. 1 and 2.

A load applied through inputting shaft 14 is transmitted via coil spring 15 to convex part 11*e*. At this time, stress is concentrated on strain resistance element 13*a* disposed inside, so that resistance is changed. On the other hand, stress is not generated at strain resistance element 13*b* disposed outside, so that resistance is not changed. As a result, the Wheatstone bridge combined them becomes a half bridge, so that a variation in resistance by force-on-pedal is changed into a variation in voltage. This variation in voltage is changed into a certain voltage value by processing circuit 45 mounted on circuit board 40, and outputted via terminal 37 to the outside. When excessive force-on-pedal is applied, first stopper 16 contacts substrate 11 as a stopper, because an outer diameter of first stopper 16 is larger than an inner diameter of cylindrical section 11*a* of substrate 11. Therefore, a load over a predetermined load is not transmitted.

In addition, forming an appropriate clearance between inputting shaft 14 and hole part 11*d* can prevent generation of undesirable twisting and prying caused by friction or the like in applying the load. As a result, even when a load is applied to inputting shaft 14 in a slightly slanting direction, coil spring 15 accommodates variations or play, so that precise load can be detected.

Still further, substrate 11 may be formed as the following method: forming strain resistance element 13 and processing circuit 45 in one piece at a flat plate; and then fixing cylindrical section 11*a* to the back of the plate, where strain resistance element 13 is formed, by welding or the like. Using this method, connecting structure between side section 11*c* and circuit board 40 becomes simple, so that connecting reliability can be improved.

Next, an operation of the pedal-pressure detecting device is discussed hereinafter with reference to FIG. 3.

When a driver presses pedal section 4, force-on-pedal is transmitted via lever section 5 from push-rod 3 to master cylinder 53. Simultaneously, arm 7 transmits the force-on-pedal from load applied point 52 to force-on-pedal sensor 1, where first shaft 6 operates as a working point and second shaft 10 operates as a supporting point. However, the load transmitted to force-on-pedal sensor 1 is attenuated. An attenuation ratio is determined by a ratio of a distance between load applied point 52 and second shaft 10 to a distance between second shaft 10 and first shaft 6.

Yet further, a universal joint section is formed between arm 7 and inputting shaft 14 of force-on-pedal sensor 1 (i.e. load applied point 52). As a result, force in a vertical direction is always applied to inputting shaft 14 of force-on-pedal sensor 1, so that detecting accuracy is further improved.

As discussed above, the force-on-pedal sensor of the present invention has a simple structure, thereby having effects of high structural reliability and easy-handling.

INDUSTRIAL APPLICABILITY

A force-on-pedal sensor of the present invention has a simple structure formed of a few components, so that structural reliability is also high. In addition, it has a stopper structure inside, so that handling is easy. Therefore, in a motor vehicle or the like which particularly requires high reliability, the sensor is widely used as a force-on-pedal sensor for detecting force-on-pedal exerted on an accelerator, a brake or the like, and a pedal-pressure detecting device using the same.

The invention claimed is:

1. A force-on-pedal sensor comprising:
   a cylindrical substrate whose one end is closed having:
   a hole at a center of a side section of the cylindrical substrate; and
   a strain resistance element via an insulating layer at the side section of the cylindrical substrate;
   a coil spring coaxially inserted from an open end of the substrate;
   an inputting shaft having a stepped part contacted with one end of the coil spring and inserted in the hole in such a manner that a part of the inputting shaft is protruded from the hole; and
   a stopper at a position where the inputting shaft is protruded,
   wherein a first stopper having an outer diameter larger than an inner diameter of a cylindrical section of the substrate is inserted into the stepped part of the inputting shaft, and contacts the coil spring,
   wherein when the coil spring is contracted to a certain load, the first stopper contacts the substrate, so that no more load is applied.

2. The force-on-pedal sensor of claim 1,
   wherein a screw section is formed at an outer circumference of a cylindrical section of the substrate.

3. The force-on-pedal sensor of claim 1,
   wherein the substrate is formed by mechanically coupling the side section with a cylindrical section, and the strain resistance element and a processing circuit are formed in one piece at the side section.

4. A pedal-pressure detecting device comprising:
   a brake arm;
   a link whose one end is linked with the brake arm using a rotatable first shaft and the other end is linked with a push-rod which transmits force to a master cylinder; and
   an arm, which is installed at the link, for transmitting a load by contacting the inputting shaft of a force-on-pedal sensor comprising:
   a cylindrical substrate whose one end is closed having:
   a hole at a center of a side section of the cylindrical substrate; and
   a strain resistance element via an insulating layer at the side section of the cylindrical substrate;
   a coil spring coaxially inserted from an open end of the substrate;
   an inputting shaft having a stepped part contacted with one end of the coil spring and inserted in the hole in such a manner that a part of the inputting shaft is protruded from the hole; and
   a stopper at a position where the inputting shaft is protruded.

5. A pedal-pressure detecting device comprising:

a brake arm;

a link whose one end is linked with the brake arm using a rotatable first shaft and the other end is linked with a push-rod which transmits force to a master cylinder; and an arm, which is installed at the link, for transmitting a load by contacting the inputting shaft of the force-on-pedal sensor of claim 2.

6. A pedal-pressure detecting device comprising:

a brake arm;

a link whose one end is linked with the brake arm using a rotatable first shaft and the other end is linked with a push-rod which transmits force to a master cylinder; and an arm, which is installed at the link, for transmitting a load by contacting the inputting shaft of the force-on-pedal sensor of claim 1.

7. A pedal-pressure detecting device comprising:

a brake arm;

a link whose one end is linked with the brake arm using a rotatable first shaft and the other end is linked with a push-rod which transmits force to a master cylinder; and an arm, which is installed at the link, for transmitting a load by contacting the inputting shaft of the force-on-pedal sensor of claim 3.

8. The pedal-pressure detecting device of claim 4, wherein a universal joint section is formed at a load applied point between the arm and the inputting shaft.

9. The pedal-pressure detecting device of claim 5, wherein a universal joint section is formed at a load applied point between the arm and the inputting shaft.

10. The pedal-pressure detecting device of claim 6, wherein a universal joint section is formed at a load applied point between the arm and the inputting shaft.

11. The pedal-pressure detecting device of claim 7, wherein a universal joint section is formed at a load applied point between the arm and the inputting shaft.

* * * * *